United States Patent

Volkmann

[11] Patent Number: 4,570,486
[45] Date of Patent: Feb. 18, 1986

[54] ULTRASONIC THICKNESS GAUGE CIRCUIT WITH TRANSIT PATH CORRECTION

[75] Inventor: Klaus Volkmann, Bergisch-Gladbach, Fed. Rep. of Germany

[73] Assignee: Krautkramer-Branson, Inc., Lewistown, Pa.

[21] Appl. No.: 671,203

[22] Filed: Nov. 14, 1984

[30] Foreign Application Priority Data

Jan. 14, 1984 [DE] Fed. Rep. of Germany ....... 3401144

[51] Int. Cl.⁴ ............................................ G01N 29/00
[52] U.S. Cl. ........................................ 73/597; 73/616
[58] Field of Search .................. 73/597, 644, 616, 624

[56]  References Cited
U.S. PATENT DOCUMENTS 4,182,155  1/1980  Fowler ................................. 73/644
4,388,830  6/1983  Narushima ........................... 73/597
4,437,332  3/1984  Pittaro ................................. 73/597

Primary Examiner—Howard A. Birmiel
Attorney, Agent, or Firm—Ervin B. Steinberg; Philip J. Feig

[57] ABSTRACT

An ultrasonic thickness gauge circuit includes a dual transducer probe and a logic circuit for providing square wave signals whose duration is equal to the time interval between the ultrasonic signal entering a workpiece to be measured and the reception of the ultrasonic signal reflected at the rear surface of the workpiece. When measuring thin wall thicknesses a measuring error arises due to the "V"-shaped transit path of the ultrasonic signals being greater than twice the wall thickness of the workpiece. A low-pass filter and a comparator are provided for modifying the square wave signals to effect correction. The modified signal is then used for providing clock pulses, the quantity of which is a measure of the wall thickness of the workpiece.

2 Claims, 4 Drawing Figures

ULTRASONIC THICKNESS GAUGE CIRCUIT WITH TRANSIT PATH CORRECTION

BRIEF SUMMARY OF THE INVENTION

This invention relates to an ultrasonic thickness gauge measuring circuit which includes means for correcting the sonic transit path error. The circuit comprises, as is well known, separate transmit and receive transducers (dual probe), a gate logic element for generating square wave signals (primary square wave signals), the duration of each of the square wave signals being proportional to the transit time of the ultrasonic pulses in the workpiece, an AND gate for associating the square wave signals with counting pulses from a pulse generator, and a pulse counter following the AND gate. In order to correct for the sonic transit path error a low-pass filter circuit is connected between the gate logic element and the AND gate.

U.S. Pat. No. 3,486,368 to K. H. Brech dated Dec. 30, 1969 and U.S. Pat. No. 3,554,016 to K. H. Brech dated Jan. 12, 1971 show two electroacoustic transducers in side by side arrangement (known as a transmit-receive test probe or dual transducer probe) for wall thickness measurement. One transducer (transmit transducer) transmits an ultrasonic signal into the workpiece and at the same time triggers the start of a square wave signal. The other transducer (receive transducer) receives the ultrasonic signal reflected at the back wall of the workpiece and terminates the square wave signal. The duration of the square wave signal is thus equivalent to the transit time of the ultrasonic signal in the workpiece. The sonic transit path s in the workpiece can be determined from the measured duration t of the square wave signal, using the speed of sound c in the workpiece. The equation applicable is $s = c \times t$. Because of the reflection of the ultrasonic signal at the back wall, the wall thickness d of the workpiece is given by: $d = \frac{1}{2}s$.

The duration of the square wave signal is determined by counting pulses. To this end, both the counting pulses and the square wave signal are fed to an AND gate and the quantity of counting pulses at the output of the AND gate provided during the duration of the square wave signal is counted out in a counter.

The disadvantage of this known wall thickness measurement resides in the fact that the sonic transit path through the workpiece is longer than twice the wall thickness due to the geometric arrangement of the transducers when measuring a wall thickness which is not very large compared with the spacing of the transducers, see FIG. 1. It must be kept in mind that the receive transducer receiving the ultrasonic signals can receive from the transmit transducer only sound beams which are transmitted at an angle not normal to the workpiece surface. The sound beams must have an angle $\alpha$ to the normal and geometric considerations given $\alpha = \arctan g/2d$, wherein g is the distance between the transmit transducer and receive transducers. The sonic transit path is accordingly greater than twice the wall thickness, being actually $s = 2d/\cos \alpha$.

It is known to correct this sonic transit path error by adjusting the wall thickness meter using a calibration specimen having the same speed of sound as the workpiece and having a known thickness.

A disadvantage of this is that on a change to other wall thickness measurement ranges or to a different workpiece material the measuring system has to be re-calibrated each time.

The object of this invention is to provide a circuit wherein the sonic transit path error is corrected independently of the wall thickness measurement range and without the need for a calibration specimen.

BRIEF DESCIPTION OF THE DRAWINGS

DETAILED DESCRIPTION OF THE INVENTION

Figure 1:
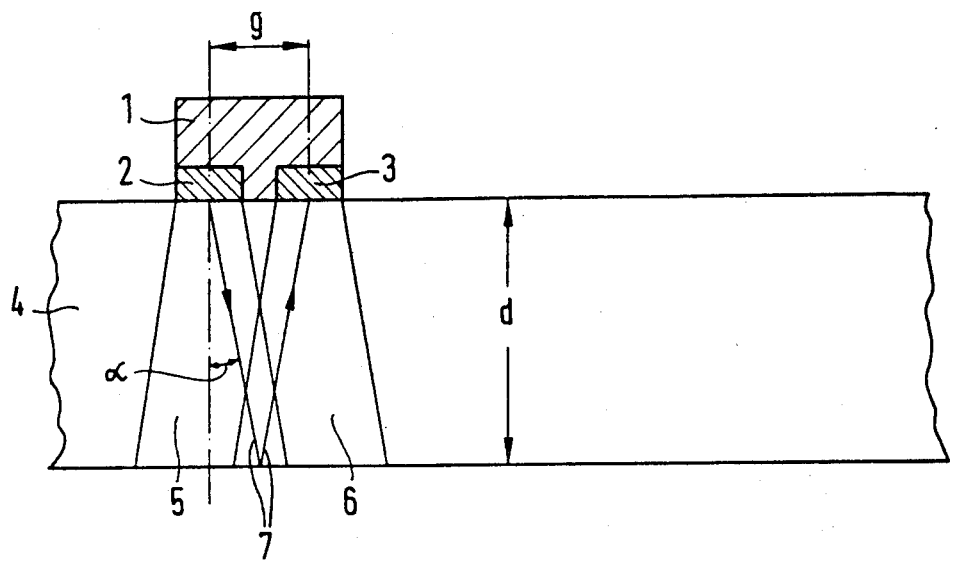
FIG. 1 is a schematic view showing the path of the sonic beam in a workpiece.

FIG. 1 shows a dual transducer probe 1 having an electroacoustic transmit transducer 2 and an electroacoustic receive transducer 3. The probe 1 is located on a workpiece 4 and is acoustically coupled thereto. For the sake of clarity, and because it is not relevant to the principle of the invention, no acoustic delay lines are shown as disposed between the electroacoustic transducers 2, 3 and the workpiece 4. The boundaries of the sonic beam are illustrated diagrammatically by numerals 5 and 6. Line 7 denotes the main sonic beam from the transmit transducer 2 to the receive transducer 3. Hereinafter this line 7 will correspond to the sonic transit path s. The center-to-center distance between the transducers 2 and 3 is denoted by reference g and the wall thickness to be measured in the workpiece 4 is denoted by reference d.

It will be seen from FIG. 1 that the sonic transit path is $s = 2d/\cos \alpha$. The angle $\alpha$ is defined by $\alpha = \arctan g/2d$ and, hence, depends on the wall thickness d for a constant transducer spacing g. In the case of wall thicknesses d which are very large in relation to the transducer spacing g, the angle $\theta$ becomes very small and then $d \approx s/2$, since $\cos \alpha \approx 1$. Half the sonic transit path, therefore, corresponds relatively accurately to the actual wall thickness d of the workpiece 4.

If the wall thickness d of the workpiece 4 is of the order of magnitude of the transducer spacing g, the above considerations no longer apply, since it must now be remembered that $\cos \alpha < 1$. The measured value $s/2$ indicated is larger than the actual wall thickness value d. The measured value must therefore be corrected with a function corresponding approximately to $1/\cos \alpha$. This correction is effected by means of the circuit shown more specifically in FIG. 2.

Figure 2:
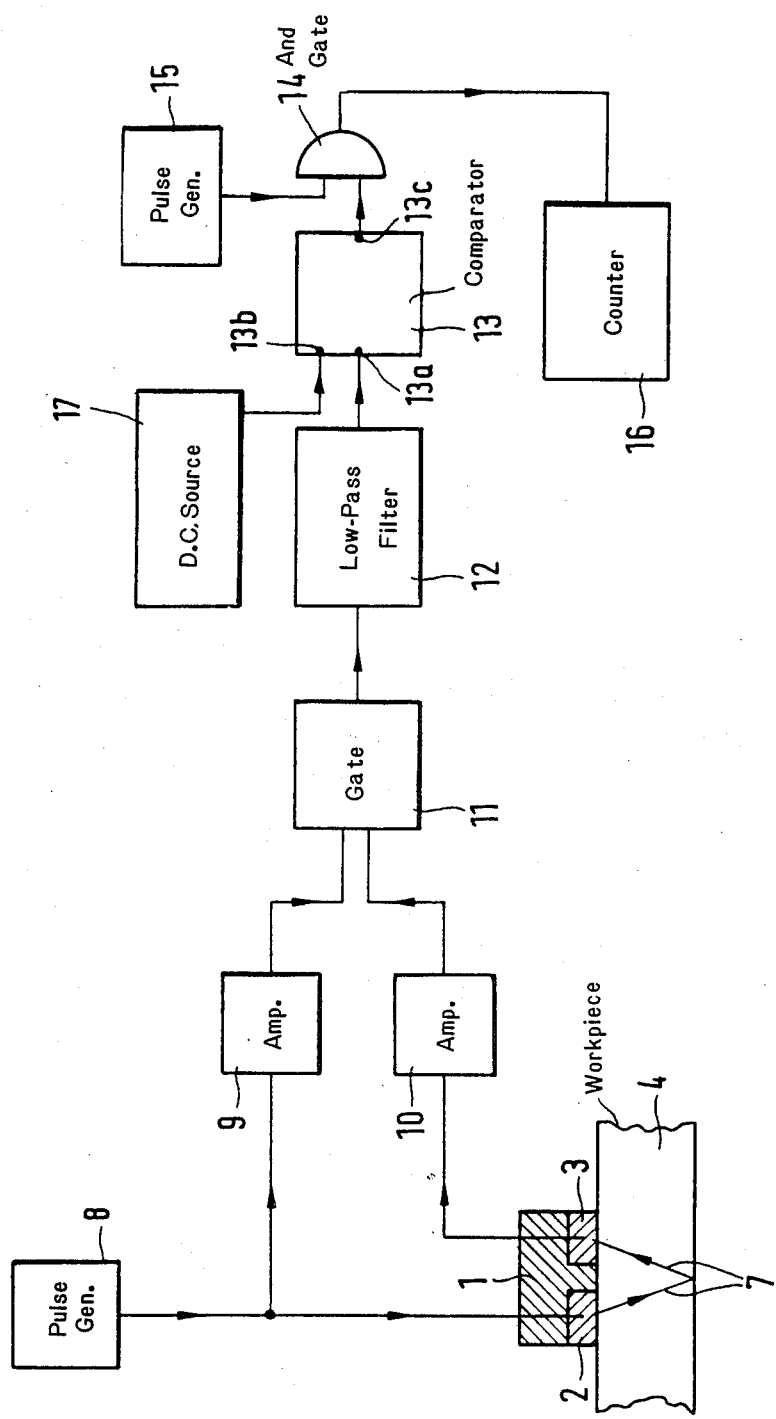
FIG. 2 is a schematic block diagram of a circuit according to the invention.

Referring to FIG. 2, reference numeral 8 denotes a pulse transmitter connected both to the transmit transducer 2 of the probe 1 and to the first input of a gate logic element 11 via a first amplifier 9. The receive transducer 3 of the probe 1 is connected to the second input of the gate logic element 11 via a second amplifier 10. The gate logic element 11 preferably is a flip-flop circuit.

The output of the gate logic element 11 is connected, according to the invention, to a low-pass filter 12, the output of which is connected to the first input 13a of a comparator 13. An adjustable direct current source 17 is connected to the second input 13b of the comparator.

The output 13c of comparator 13 is connected to the first input of an AND gate 14, and a pulse generator 15 is coupled to the second input of AND gate 14. The AND gate 14 is followed by a digital counter 16.

The operation of the circuit according to the invention shown in FIG. 2 will be explained in detail hereinafter with reference to FIGS. 3a to 3g.

The pulse transmitter 8 generates electrical transmission pulses at predetermined time intervals, these pulses being fed to the transmit transducer 2 and, via the first amplifier 9, to the first input of the gate logic element 11. The transmit transducer 2 converts the transmission pulses into ultrasound pulses which enter the workpiece 4, are reflected at its back wall, received by the receive transducer 3, and converted to electrical reception pulses. The latter pass via the second amplifier 10 to the second input of the gate logic element 11.

Figure 3:
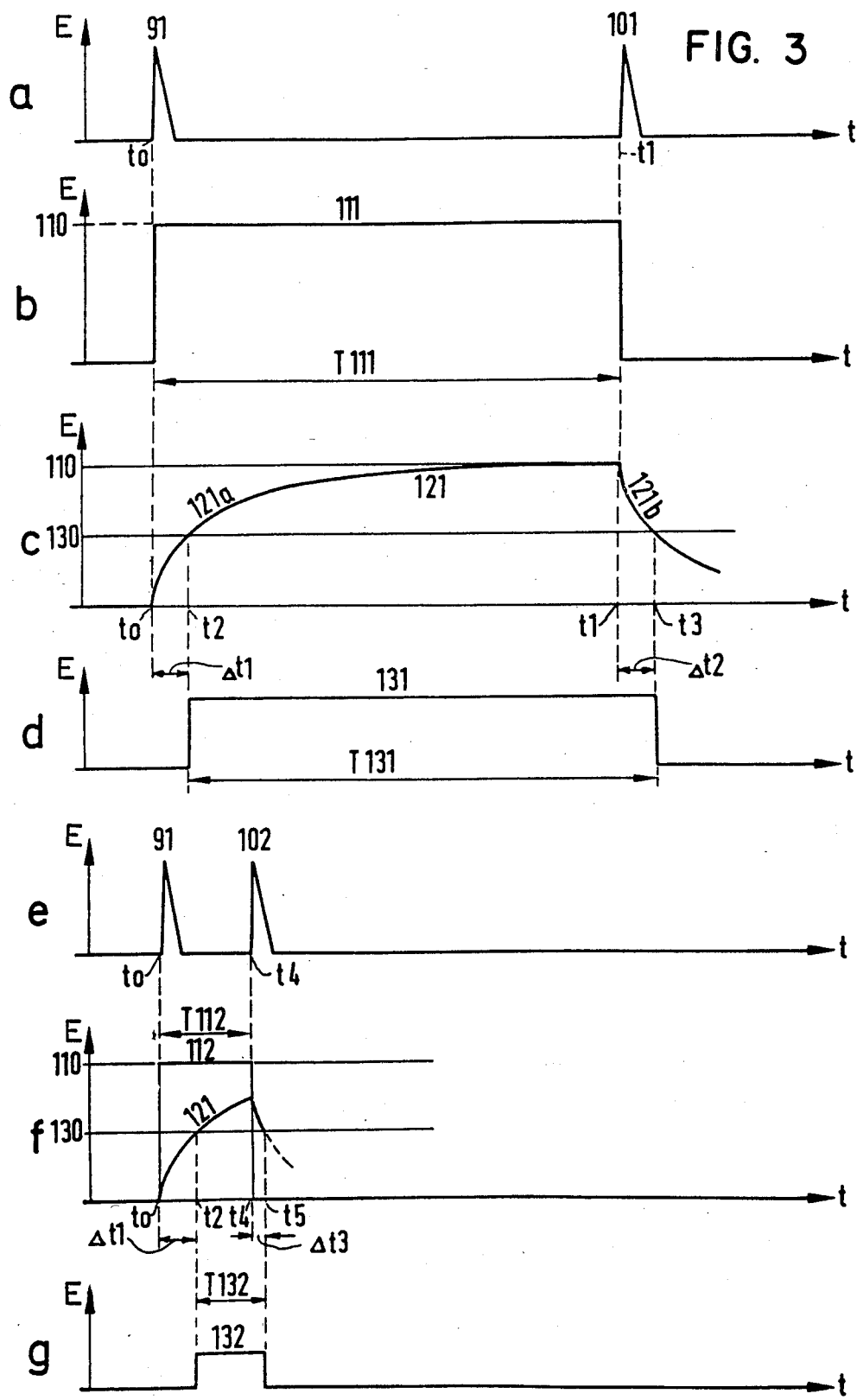
FIGS. 3a to 3g are pulse diagrams showing the electrical signals at different points of the circuit according to FIG. 2.

In FIG. 3a, reference numeral 91 denotes a transmission pulse at the first input of the gate logic element 11, representing the time at which the ultrasound signal enters the workpiece, while numeral 101 denotes the arrival of the reception pulse at the second input of the gate logic element 11. A primary square wave signal 111 then appears at the output of the gate element 11 with the voltage amplitude 110 as shown in FIG. 3b, its duration T111 being equal to the time interval between the occurrence of the pulses 91 and 101 (T111=t1−to). Accordingly, the duration T111 of the square wave signal is equal to the transit time of the ultrasonic pulse through the workpiece. Given the known speed of sound in the workpiece, the sonic transit path is determined from this transit time.

According to the invention, the primary square wave signal 111 is fed to the low-pass filter 12 (FIG. 2). By means of this filter the ascending slope of the primary square wave signal is given an exponential curve (curve 121, FIG. 3c). This exponential curve is dependent on the filter order, i.e., the number of filter elements and the time constants selected for the filter 12.

For a very long primary square wave signals 111, i.e., when $\cos \alpha \approx 1$, the output voltage 121 of the low-pass filter 12 reaches the maximum value 110 as shown in FIG. 3c. For a low pass, the descending slope 121b must be inversely congruent to the ascending slope 121a. The secondary square wave signal 131 of the comparator 13, whose comparison voltage 130 is exactly half the voltage amplitude 110 of the primary square wave signal 111, is delayed with respect to the ascending slope of the primary square wave signal 111 by the time $\Delta t1 = t2 - to$, but both square wave signals 111 and 131 have the same duration (T131=T111), since the descending slope 121b also has the same delay $\Delta t1 = \Delta t2 = t3 - t1$, as will be seen from FIG. 3c.

If the sonic transit path, and hence also the sonic transit time, are very short, the transmission pulse and the reception pulse are closer together as shown in FIG. 3e. Reference 91 again denotes the transmission pulse and 102 the reception pulse which has a short sonic transit time. The primary square wave signal is accordingly shorter as shown in FIG. 3f, curve 112. As a result of this shorter square wave signal 112, the output voltage of the low-pass filter 12 has not yet reached the full voltage amplitude 110 at the time of the arrival of the descending slope of the primary square wave signal (curve 121). After a shorter delay time $\Delta t3 = t5 - t4$, compared with the delay time $\Delta t2$ in the case of longer primary square signals, the comparison voltage 130 of the comparator 13 is undershot. The duration T132 of the secondary square wave signal 132 at the output of the comparator is thus shorter than the duration T112 of the primary square wave signal 112.

The reduction of the secondary square wave signals compared with the primary square wave signals can be adjusted to the parameters influencing the sonic transit path error, for example the transducer spacing of each particular probe, by suitable dimensioning of the low-pass filter 12.

The secondary square wave signals 131 and 132 are thus corrected in accordance with the sonic transit path error and, as known, are fed to an AND gate 14 which simultaneously receives counting pulses at a predetermined pulse repetition frequency from a pulse generator 15. In the following counter 16 these counting pulses are counted out during the duration of the secondary square wave signals 131, 132 and are indicated as a wall thickness value and/or subjected to further processing.

Figure 4:
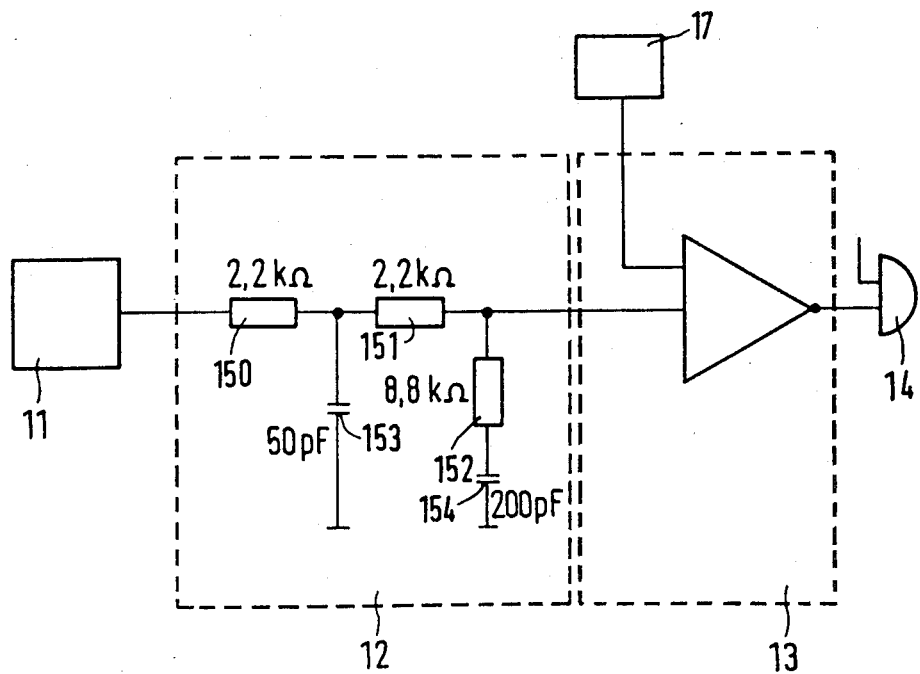
FIG. 4 is an electrical circuit diagram providing values for a typical low-pass filter useful in the present invention.

FIG. 4 illustrates one example of the dimensioning of a second-order low-pass filter 12 for primary square wave pulses of a duration of more than 0.15 μs. Filter 12 comprises three resistors 150, 151 and 152, and two capacitors 153 and 154. With the following dimensions: resistor 150=2.2 kilohms; resistor 151=2.2 kilohms; resistor 152=8.8 kilohms; capacitor 153=50 pF and capacitor 154=200 pF, the resulting filter corrects the sonic transit path error for a transmit/receive probe having a transducer edge-to-edge spacing of 2 mm when testing steel workpieces whose thickness is 1 mm and greater.

If delay lines are used between the transducers 2, 3 and the workpiece 4, the value of the comparison voltage 130 can suitably differ from the value of half the height of the primary square wave signal in order to compensate for delay lines of different lengths or different delay line transit times.

What is claimed is:

1. A circuit for correcting the sonic transit path error when measuring the wall thickness of a workpiece by the use of ultrasonic probes using a dual transducer probe having a transmit transducer for transmitting ultrasonic pulses into the front surface of a workpiece whose thickness is to be measured and having a spaced receive transducer for receiving the ultrasonic pulses after reflection at the rear surface of the workpiece and including a gate logic element coupled to said transducers for producing primary square wave signals the duration of which is proportional to the transit time of the ultrasonic pulses in the workpiece; an AND gate; a pulse generator coupled to one input of said AND gate for providing at the output of said AND gate counting pulses during the time interval during which said AND gate provides secondary square wave signals, and a pulse counter coupled to the output of said AND gate for counting the pulses from said pulse generator passed through said AND gate, the improvement comprising:

the series connection of a low-pass filter and a comparator coupled between said gate logic element and said AND gate wherein the output of said gate logic element is coupled to the input of said filter and the output of said filter is coupled to one input of said comparator, and the output of said comparator is coupled to the other input of said AND gate;

a source of direct current voltage coupled to the other input of said comparator, and the time constants of said low-pass filter being selected to cause the ratio of the duration of the secondary square wave signals produced at the output of said comparator and causing operation of said AND gate to the duration of said primary square wave signals produced at the output of said gate logic element to be proportional to the ratio of the wall thickness of the workpiece to the transit time of the ultrasonic pulses in the workpiece.

2. A circuit for correcting the sonic path error when measuring the wall thickness of a workpiece as set forth in claim 1, said filter being a second order filter.

* * * * *